US010575328B2

(12) United States Patent
Tomeba et al.

(10) Patent No.: US 10,575,328 B2
(45) Date of Patent: Feb. 25, 2020

(54) RADIO TRANSMISSION DEVICE, RADIO RECEPTION DEVICE, COMMUNICATION METHOD, AND COMMUNICATION SYSTEM

(71) Applicant: Sharp Kabushiki Kaisha, Sakai, Osaka (JP)

(72) Inventors: Hiromichi Tomeba, Sakai (JP); Tomoki Yoshimura, Sakai (JP); Takashi Onodera, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 165 days.

(21) Appl. No.: 15/522,866

(22) PCT Filed: Aug. 28, 2015

(86) PCT No.: PCT/JP2015/074383
§ 371 (c)(1),
(2) Date: Apr. 28, 2017

(87) PCT Pub. No.: WO2016/067738
PCT Pub. Date: May 6, 2016

(65) Prior Publication Data
US 2017/0325262 A1     Nov. 9, 2017

(30) Foreign Application Priority Data

Oct. 31, 2014   (JP) ................................ 2014-222235

(51) Int. Cl.
*H04W 74/08* (2009.01)
*H04W 84/12* (2009.01)
*H04W 72/04* (2009.01)

(52) U.S. Cl.
CPC ... *H04W 74/0808* (2013.01); *H04W 72/0446* (2013.01); *H04W 84/12* (2013.01)

(58) Field of Classification Search
CPC ............ H04W 84/12; H04W 74/08016; H04L 5/0055
See application file for complete search history.

(56) References Cited

U.S. PATENT DOCUMENTS 6,983,167 B2    1/2006  Adachi et al.
7,565,162 B2    7/2009  Adachi et al.
(Continued)

FOREIGN PATENT DOCUMENTS

JP    2003-124878 A    4/2003
JP    2009-500945 A    1/2009
(Continued)

OTHER PUBLICATIONS

Official Communication issued in International Patent Application PCT/JP2015/074383, dated Nov. 10, 2015.
(Continued)

*Primary Examiner* — Chandrahas B Patel
(74) *Attorney, Agent, or Firm* — Keating & Bennett, LLP

(57) ABSTRACT

Communication opportunities of existing terminal devices are ensured, in a communication system in which terminal devices capable of using a new CCA level and the existing terminal devices using an existing CCA level coexist, on the premise of CSMA/CA. A communication method of a radio transmission device of the present invention includes a step of signaling information indicating a first CCA section and a second CCA section to the radio reception device. A communication method of a radio reception device of the present invention includes a step of performing the carrier sense based on a first CCA level and a second CCA level, and a step of performing the carrier sense based on the first CCA level, in the first CCA section, based on information indicating the first CCA section.

9 Claims, 7 Drawing Sheets

(56) References Cited

U.S. PATENT DOCUMENTS

| | | | |
|---|---|---|---|
| 7,720,440 B2 | 5/2010 | Zhu et al. | |
| 8,666,319 B2 | 3/2014 | Kloper et al. | |
| 10,104,620 B2* | 10/2018 | Park | H04W 84/12 |
| 2003/0036404 A1 | 2/2003 | Adachi et al. | |
| 2006/0040709 A1 | 2/2006 | Adachi et al. | |
| 2007/0010237 A1 | 1/2007 | Jones et al. | |
| 2007/0270102 A1 | 11/2007 | Zhu et al. | |
| 2009/0147761 A1 | 6/2009 | Adachi et al. | |
| 2013/0017794 A1 | 1/2013 | Kloper et al. | |

FOREIGN PATENT DOCUMENTS

| | | |
|---|---|---|
| JP | 2012-169796 A | 9/2012 |
| WO | 2007/005319 A2 | 1/2007 |

OTHER PUBLICATIONS

Son et al., "Measurements on CCA Thresholds in OBSS Environment", IEEE 802.11-14/0628r0, May 13, 2014, 9 pages.
Coffey et al., "A Protocol Framework for Dynamic CCA", IEEE 802.11-14/0872r0, Jul. 14, 2014, 16 pages.

* cited by examiner

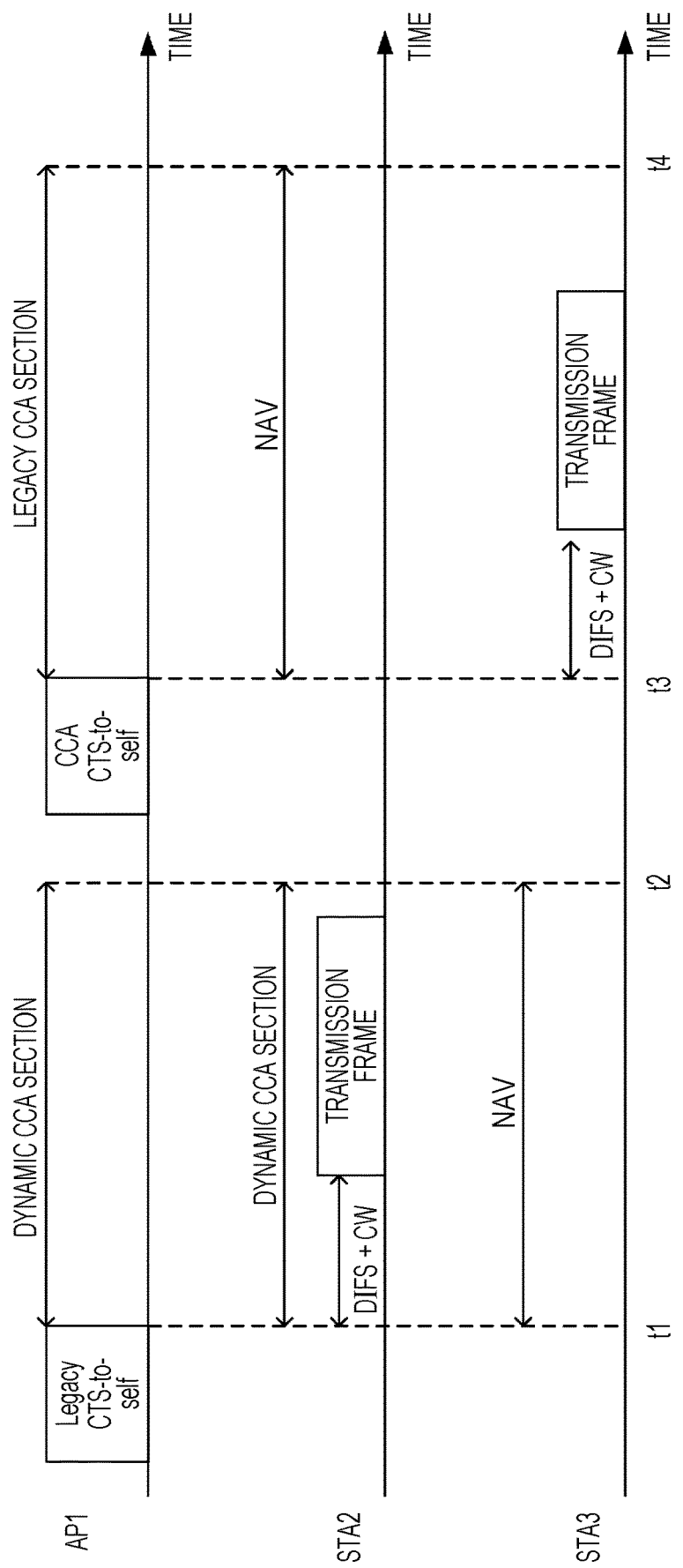

RADIO TRANSMISSION DEVICE, RADIO RECEPTION DEVICE, COMMUNICATION METHOD, AND COMMUNICATION SYSTEM

TECHNICAL FIELD

The present invention relates to a radio transmission device, a radio reception device, a communication method, and a communication system.

BACKGROUND ART

As a development standard of 802.11n which is a widely practiced wireless local area network (LAN) standard, IEEE 802.11ac standard was defined by the institute of electrical and electronics engineers, Inc. (IEEE). Currently, standardization activities of IEEE 802.11 ax have been performed as a successor standard to IEEE 802.11 n/ac. In the current wireless LAN system, interference due to an increase in the number of terminals per area is becoming a big problem, and it is necessary to consider such overcrowded environment in the IEEE 802.11ax standard. On the other hand, in the IEEE 802.11ax standard, not only improvement in peak throughput but also improvement in user throughput is main requirements, unlike the past wireless LAN standard. It is indispensable to introduce a highly efficient simultaneous multiplexing transmission method (access method) in order to improve the user throughput.

In the standards up to IEEE 802.11n, an access method of autonomous distributed control method referred to as carrier sense multiple access with collision avoidance (CSMA/CA) has been adopted as an access method. In the IEEE 802.11ac, space division multiple access (SDMA) with a multi-user multiple-input multiple-output (MU-MIMO) technology was newly added.

In the IEEE 802.11ax standard, backward compatibility for the existing IEEE 802.11 standard is required. This suggests that it is necessary to support the access method based on CSMA/CA even in the IEEE 802.11ax standard. However, in CSMA/CA which requires carrier sense prior to transmission, there is a problem that communication opportunities are greatly reduced due to interference between terminal devices under the overcrowded environment as described above. Therefore, recently, changing the threshold (CCA level, CCA threshold) of clear channel assessment (CCA) by carrier sense has been discussed for the purpose of allowing some interference and improving communication opportunities (see Non-patent Document 1 or the like). Since the terminal device stops communication if interference not less than the CCA level is measured by carrier sense, increasing the CCA level reduces the possibility that the terminal device loses communication opportunities even in overcrowded environment. Increasing the CCA level naturally causes degradation of reception quality due to interference, but communication quality is expected to be maintained by packet capture effect peculiar to packet transmission and adaptive modulation transmission.

CITATION LIST

Non Patent Literature

NPL 1: IEEE 11-14/0628 r0, "Measurements on CCA thresholds in OBSS environment," May 2014.

SUMMARY OF INVENTION

Technical Problem

However, there is a problem that whereas a new terminal device compliant with the IEEE 802. 11ax standard performs transmission based on a newly defined CCA level and obtains many communication opportunities, the existing terminal device that performs communication based on the existing CCA level (a terminal device in the past, a legacy terminal device) can hardly obtain communication opportunities.

The present invention has been made in view of the above problems, and an object thereof is to provide a radio transmission device, a radio reception device, a communication system, and a communication method, which are capable of improving communication opportunities of new terminal devices while securing communication opportunities of existing terminal devices, in a communication system in which terminal devices capable of using a new CCA level and existing terminal devices using an existing CCA level coexist, on the premise of CSMA/CA.

Solution to Problem

A radio transmission device, a radio reception device, a communication system, and a communication method according to the present invention for solving the above problems are as follows.

(1) In other words, according to the present invention, there is provided a radio transmission device which performs communication with a radio reception device, in a communication system requiring carrier sense, in which the radio transmission device signals information indicating a first CCA section to the radio reception device.

(2) In the radio transmission device according to (1), the radio transmission device further signals information indicating a second CCA section to the radio reception device.

(3) The radio transmission device according to (1) signals information indicating end of the first CCA section, to the radio reception device, within the first CCA section.

(4) The radio transmission device according to (1) or (3) includes the information indicating the first CCA section in a beacon frame broadcasted to the radio reception device.

(5) The radio transmission device according to (1) or (3) transmits a second resource reservation frame before the first CCA section, and transmits a first resource reservation frame before a second CCA section.

(6) In the radio transmission device according to (5), the radio reception device includes a first radio reception device and a second radio reception device, and the first resource reservation frame is a frame that cannot be recognized as a resource reservation frame by the second radio reception device.

(7) In the radio transmission device according to (6), the carrier sense is performed based on a first CCA level in the first CCA section, the carrier sense is performed based on a second CCA level in the second CCA section, and the first CCA level is higher than the second CCA level.

(8) According to the present invention, there is provided a radio reception device which performs communication with a radio transmission device, in a communication system requiring carrier sense, the radio reception device including a reception unit that performs the carrier sense based on a first CCA level and a second CCA level, and the carrier sense is performed based on the first CCA level, in a first CCA section, based on information indicating the first CCA section.

(9) In the radio reception device according to (8), the carrier sense is further performed based on the second CCA level, in the second CCA section, based on information indicating a second CCA section.

(10) The radio reception device according to (8) or (9) further includes a transmission unit that transmits a frame, and a CCA level in the first CCA section is determined based on a type of a frame transmitted by the transmission unit.

(11) The radio reception device according to (8) or (9), the carrier sense is performed based on the second CCA level, in a case where information indicating end of the first CCA section is signaled from the radio transmission device.

(12) The radio reception device according to (8), a second resource reservation frame is transmitted from the radio transmission device, and the carrier sense is performed based on the first CCA level, in a section described in the second resource reservation frame.

(13) The radio reception device according to (12), a first resource reservation frame is transmitted from the radio transmission device, and communication is stopped in a section described in the first resource reservation frame.

(14) The radio reception device according to (12), a first resource reservation frame is transmitted from the radio transmission device, and the carrier sense is performed based on the second CCA level, in a section described in the first resource reservation frame.

(15) According to the present invention, there is provided a communication method of a radio transmission device which performs communication with a radio reception device, in a communication system requiring carrier sense, the communication method including a step of signaling information indicating a first CCA section to the radio reception device.

(16) According to the present invention, there is provided a communication method of a radio reception device which performs communication with a radio transmission device, in a communication system requiring carrier sense, the communication method including a step of performing the carrier sense based on a first CCA level and a second CCA level, and a step of performing the carrier sense based on the first CCA level, in the first CCA section, based on information indicating a first CCA section.

(17) According to the present invention, there is provided a communication system including a radio transmission device and a radio reception device, and requiring carrier sense, in which the radio transmission device signals information indicating a first CCA section to the radio reception device, the radio reception device includes a reception unit that performs the carrier sense based on a first CCA level and a second CCA level, and the carrier sense is performed based on the first CCA level, in the first CCA section, based on information indicating the first CCA section.

Advantageous Effects of Invention

According to the present invention, it is possible to realize a wireless LAN system capable of improving communication opportunities of new terminal devices while securing communication opportunities of existing terminal devices, so it is possible to greatly improve user throughput.

BRIEF DESCRIPTION OF DRAWINGS

FIG. 7 is a diagram illustrating an example of communication according to the present invention.

DESCRIPTION OF EMBODIMENTS

1. First Embodiment

Figure 1:
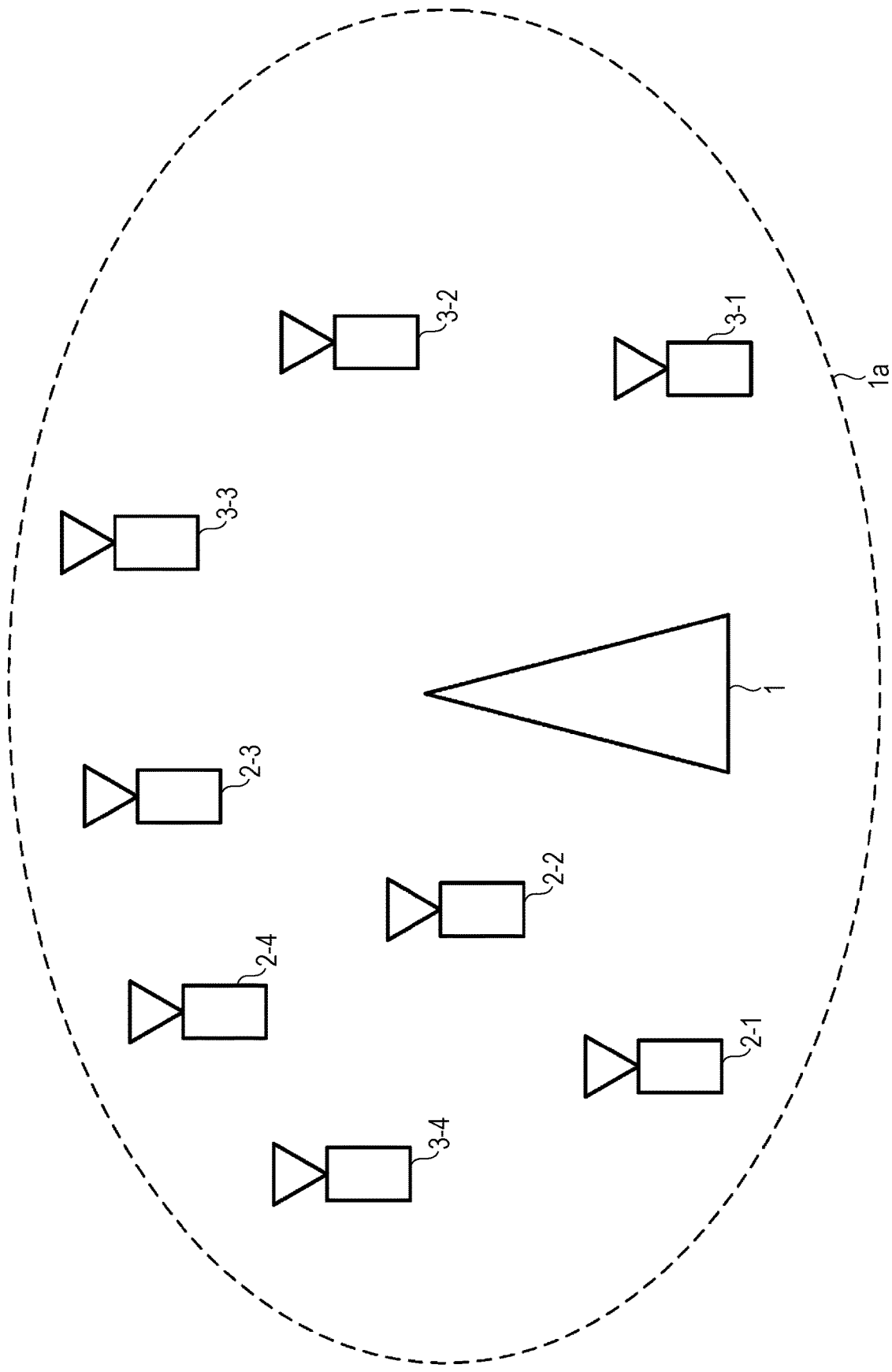
FIG. 1 is a diagram illustrating an example of a communication system according to the present invention.

A communication system according to the present embodiment includes a radio transmission device (access point (AP)), and a plurality of radio reception devices (stations (STA)). Further, a network including the AP and the STAs is referred to as a basic service set (BSS).

It is assumed that the AP and the STAs in the BSS respectively communicate with each other based on carrier sense multiple access with collision avoidance (CSMA/CA). The present embodiment is directed to an infrastructure mode in which the AP communicates with a plurality of STAs, but a method of the present embodiment can be implemented even in an ad-hoc mode in which the STAs directly communicate with each other.

In the IEEE 802.11 system, respective devices can transmit transmission frames of a plurality of frame types having a common frame format. The transmission frames are respectively defined by a physical (PHY) layer, a medium access control (MAC) layer, and a logical link control (LLC) layer.

The transmission frame of the PHY layer is referred to as a PHY protocol data unit (PPDU). The PPDU includes a physical layer header (PHY header) containing header information and the like for processing signals in the physical layer, a physical service data unit (PHY service data unit: PSDU) which is a data unit processed in the physical layer, and the like. The PSDU can be configured with an aggregated MPDU (A-MPDU) in which a plurality of MAC protocol data units (MPDUs) which are re-transmission units in a radio section are aggregated.

The PHY header includes reference signals such as a short training field (STF) used for signal detection and synchronization and a long training field (LTF) used for acquiring channel information for data demodulation, and a control signal such as a signal (SIG) including control information for data demodulation. In addition, the STF is classified into a legacy-STF (L-STF), a high throughput-STF (HT-STF), a very high throughput-STF (VHT-STF), and the like, according to the corresponding standard, and the LTF and the SIG are similarly classified into L-LTF, HT-LTF, VHT-LTF, L-SIG, HT-SIG, and VHT-SIG. The VHT-SIG is further classified into VHT-SIG-A and VHT-SIG-B.

The PPDU is modulated according to the corresponding standard. For example, in the IEEE 802.11n standard, the PPDU is modulated into an orthogonal frequency division multiplexing (OFDM) signal.

The MPDU includes a MAC layer header (MAC header) including header information and the like for processing signals in the MAC layer, a MAC service data unit (MSDU)

which is a data unit processed in the MAC layer or a frame body, and a frame check sequence (FCS) for checking whether there is an error in a frame. Further, a plurality of MSDUs can be aggregated as an aggregated MSDU (A-MSDU).

The frame type of the transmission frame of the MAC layer is roughly classified into three frames: a management frame for managing a coupled state between devices, a control frame for managing a communication state between devices, and a data frame containing actual transmission data, and is further classified into a plurality of subframe types. The control frame includes an Acknowledge (ACK) frame, a Request to send (RTS) frame, a Clear to send (CTS) frame, and the like. The management frame includes a Beacon frame, a Probe request frame, a Probe response frame, an Authentication frame, an Association request frame, an Association response frame, or the like. The data frame includes a data (Data) frame, a polling (CF-poll) frame, and the like. Each device can recognize the frame type and the subframe type of the received frame, by reading the contents of the frame control field included in the MAC header.

The beacon frame includes a field describing an interval (beacon interval) at which a beacon is transmitted and information identifying the AP (such as service set identifier (SSID)). The AP can periodically broadcast the beacon frame to the BSS, and the STA can recognize the AP around the STA by receiving the beacon frame. The STA recognizing the AP based on the signal broadcasted from the AP is referred to as passive scanning. On the other hand, the STA broadcasting the probe request frame to the BSS and searching for an AP is referred to as active scanning. The AP can transmit a probe response frame as a response to the probe request frame, and the description content of the probe response frame is equivalent to the beacon frame.

After recognizing the AP, the STA performs an association process for the AP. The association process is classified into an authentication procedure and an association procedure. The STA transmits an authentication frame to the AP with which the STA desires association. Upon receiving the authentication frame, the AP transmits to the STA, an authentication frame including a status code indicating whether or not the STA is authenticated. By reading the status code described in the authentication frame, the STA can determine whether or not the STA is authenticated by the AP. In addition, the AP and the STA can exchange the authentication frame a plurality of times.

Following the authentication procedure, the STA transmits an association request frame to perform the association procedure on the AP. Upon receiving the association request frame, the AP determines whether or not to permit the association of the STA, and transmits an association response frame in order to make a notification of the association. In the association response frame, an association identifier (AID) for identifying the STA is described, in addition to a status code indicating whether or not the association process is possible. The AP can manage a plurality of STAs by configuring different AIDs for the STAs to which association permissions are issued.

After the association process is performed, the AP and the STA perform actual data transmission. In the IEEE 802.11 system, Distributed Coordination Function (DCF), Point Coordination Function (PCF), a Hybrid coordination function (HCF) which is an extended function thereof, and the like are defined. In the following, a case where the AP transmits a signal to the STA in a DCF mode will be described as an example.

In the DCF mode, the AP and the STA perform carrier sense (CS) for checking the usage status of the radio channels around the AP and the STA prior to communication. For example, the AP which is the transmission station delays the transmission of the transmission frame on the radio channel, upon receiving a signal that is higher than a predetermined clear channel assessment level (CCA level) on the radio channel. Hereinafter, a state in which a signal having a CCA level or higher is detected on the radio channel is referred to as a busy state, and a state in which a signal having a CCA level or higher is not detected is referred to as an idle state. In this manner, a CS performed based on the power of a signal actually received by each device is referred to as physical carrier sense (physical CS). The CCA level is also referred to as a carrier sense level (CS level) or a CCA threshold (CCAT). In a case of detecting a signal of the CCA level or higher, the AP and the STA start an operation of demodulating at least the signal of the PHY layer.

The AP performs carrier sense only for an inter frame space (IFS) according to the type of a transmission frame to be transmitted, and determines whether a radio channel is in a busy state or an idle state. The period during which the AP performs carrier sense differs depending on the frame type and subframe type of the transmission frame that the AP transmits. In the IEEE 802.11 system, a plurality of IFSs having different periods are defined, and there are a short frame interval (Short IFS: SIFS) used for a transmission frame given the highest priority, a polling frame interval (PCF IFS: PIFS) used for a transmission frame having a relatively high priority, a dispersion control frame interval (DCF IFS: DIFS) used for a transmission frame having the lowest priority, and the like. In a case where the AP transmits a data frame with the DCF mode, the AP uses the DIFS.

After waiting only for DIFS, the AP waits further for a random backoff time to prevent frame collision. In the IEEE 802.11 system, a random backoff time referred to as a contention window (CW) is used. In the CSMA/CA, it is assumed that a transmission frame transmitted by a certain transmission station is received by a reception station in a state where there is no interference from other transmission stations. Therefore, if transmission stations transmit the transmission frames at the same timing, the frames collide with each other, and the reception stations cannot correctly receive the transmission frames. Hence, each transmission station waits for a time that is randomly set, before starting transmission, such that frame collision is avoided. If the AP determines that the radio channel is in the idle state by the carrier sense, it starts countdown of CW, acquires a transmission right only after the CW becomes 0, and can transmit the data frame to the STA. If the AP determines that the radio channel is busy by carrier sense during the countdown of the CW, the countdown of the CW is stopped. Then, in a case where the radio channel is in the idle state, the AP restarts the countdown of remaining CWs following the previous IFS.

The STA, which is a reception station, receives a transmission frame, reads the PHY header of the transmission frame, and demodulates the received transmission frame. Then, the STA can recognize whether or not the transmission frame is addressed to the STA, by reading the MAC header of the demodulated signal. The STA can also determine the destination of the transmission frame, based on the information described in the PHY header (for example, a group identifier (Group ID) described in VHT-SIG-A).

The STA determines that the received transmission frame is addressed to the STA, and in a case where the transmission frame can be demodulated without an error, the STA needs to transmit an ACK frame indicating that the frame can be correctly received, to the AP which is the transmission station. The ACK frame is one of the transmission frames having the highest priority transmitted only for waiting for the SIFS period (a random backoff time is not taken). Upon receiving the ACK frame transmitted from the STA, the AP ends a series of communications. In a case where the STA cannot correctly receive the frame, the STA does not transmit the ACK. Therefore, in a case where the AC does not receive the ACK frame from the reception station for a certain period (SIFS+ACK frame length) after transmitting the frame, the AP determines that the communication has failed and ends the communication. In this manner, the end of one communication (also referred to as a burst) in the IEEE 802.11 system needs to be determined by the presence or absence of reception of the ACK frame, except for a special case including a case of transmitting a broadcast signal such as a beacon frame or a case of using fragmentation for splitting transmission data.

In a case where the received transmission frame is not determined to be addressed to the STA, the STA sets a network allocation vector (NAV), based on the length of the transmission frame described in the PHY header or the like. The STA does not attempt communication during a period set in the NAV. That is, since the STA performs the same operation as in the case where the radio channel is determined to be busy by the physical CS during the period set in the NAV, communication control by the NAV is also referred to as virtual carrier sense (virtual CS). The NAV is also set based on a Request to send (RTS) frame and a Clear to send (CTS) frame introduced to solve a hidden terminal problem, as well as being set based on the information described in the PHY header.

While each device performs carrier sense and autonomously acquires a transmission right in the DCF mode, a control station referred to as a point coordinator (PC) controls the transmission right of each device in the BSS in a PCF mode. In general, the AP is a PC and acquires a transmission right of the STA in the BSS.

The communication period by the PCF includes a contention free period (CFP) and a contention period (CP). During the CP, communication is performed based on the DCF described above, and the PC controls the transmission right during the CFP. The AP, which is a PC, broadcasts the beacon frame in which the CFP period (CFP Max duration) and the like are described to the BSS prior to the communication of the PCF. In addition, PIFS is used for transmission of a beacon frame broadcasted at the start of transmission of the PCF, and is transmitted without waiting for CW. Upon receiving the beacon frame, the STA sets the period of CFP described in the beacon frame to NAV. Thereafter, until the NAV elapses, or until a signal for notifying the end of the CFP to the BSS (for example, a data frame including CF-end) is received, the STA can obtain a transmission right, only in a case where a signal that signals the acquisition of the transmission right transmitted from the PC (for example, a data frame including a CF-poll) is received. Since collision of packets in the same BSS does not occur within the CFP period, each STA does not use a random backoff time used in the DCF mode.

The AP and the STA provided in the communication system according to the present embodiment have a function of performing a series of communication based on the CSMA/CA described above, but do not necessarily need to have all the functions.

FIG. 1 is a schematic diagram illustrating an example of a downlink of a communication system according to a first embodiment of the present invention. In the communication system of FIG. 1, there is an AP 1, and 1a indicates a range (coverage range, basic service set (BSS)) that can be managed by the AP1. There are STAs 2-1 to 4 coupled with the AP 1 and STAs 3-1 to 4 that are existing terminal devices (terminal devices in the past, legacy terminal devices) in the BSS 1a. Hereinafter, STAs 2-1 to 4 are simply referred to as an STA 2 or a first radio reception device. Similarly, STAs 3-1 to 4 are also simply referred to as an STA 3 or a second radio reception device. The AP1, the STA 2, and the STA 3 have different standards that can respectively be handled. For example, the AP 1 and the STA 2 are devices to which the present invention can be applied, and the STA 3 is a device to which the present invention is not applied.

It is assumed that AP 1, the STA 2, and the STA 3 communicate with each other based on CSMA/CA. The present embodiment is directed to an infrastructure mode in which the STA 2 and the STA 3 respectively communicate with the AP 1, but the method of the present embodiment can be implemented even in an ad-hoc mode in which the STAs directly communicate with each other.

Figure 2:
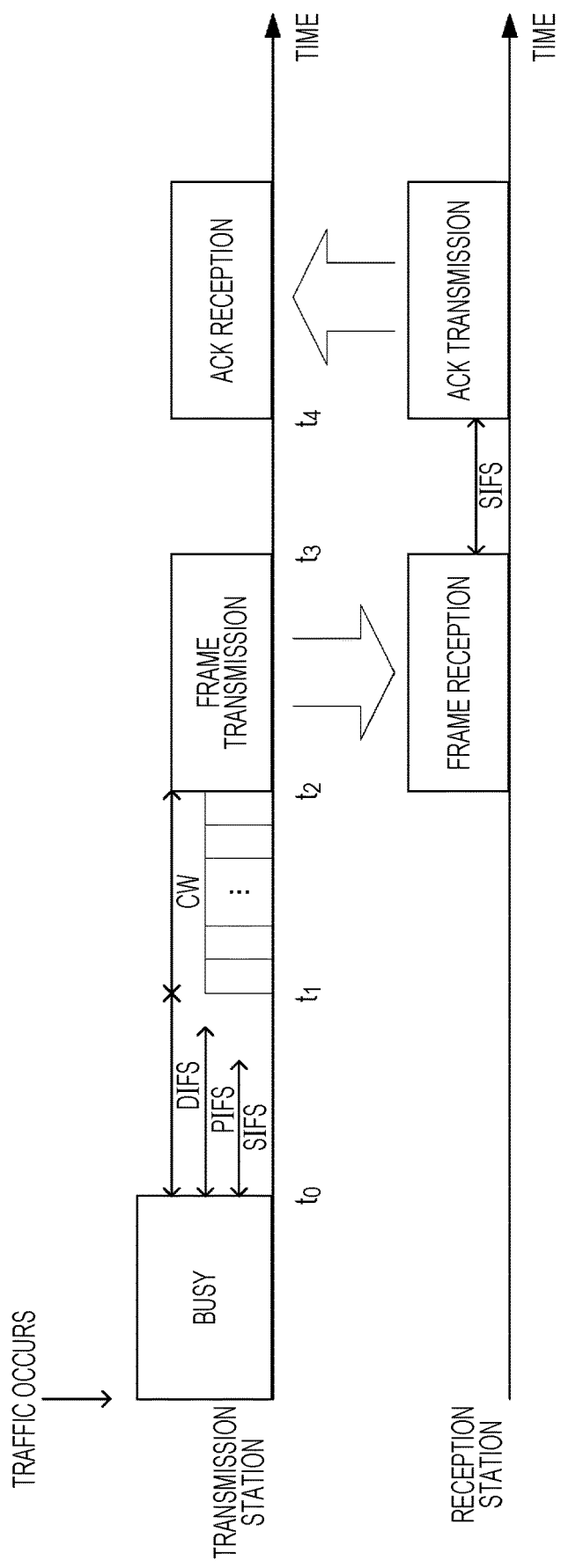
FIG. 2 is a schematic block diagram illustrating a configuration example of a radio transmission device according to the present invention.
Figure 3:
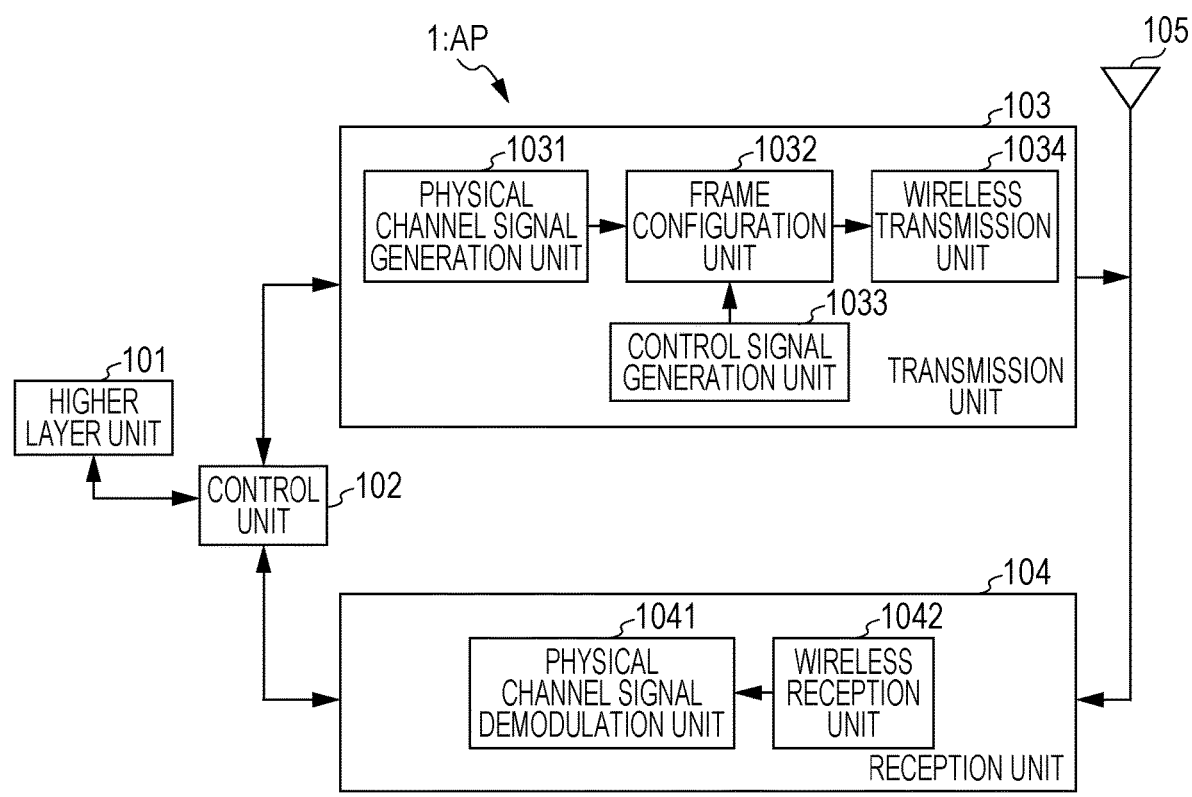
FIG. 3 is a diagram illustrating a configuration example of a frame configuration of a signal of the present invention.

FIG. 2 is a block diagram illustrating an example of the configuration of the AP 1 according to the first embodiment of the present invention. As illustrated in FIG. 3, the AP 1 includes a higher layer unit 101, a control unit 102, a transmission unit 103, a reception unit 104, and an antenna 105.

The higher layer unit 101 handles the medium access control (MAC) layer or the like. In addition, the higher layer unit 101 generates information for controlling the transmission unit 103 and the reception unit 104, and outputs the information to the control unit 102. The control unit 102 controls the higher layer unit 101, the transmission unit 103, and the reception unit 104.

The transmission unit 103 further includes a physical channel signal generation unit 1031, a frame configuration unit 1032, a control signal generation unit 1033, and a wireless transmission unit 1034. The physical channel signal generation unit 1031 generates a baseband signal that the AP 1 transmits to each STA. The signal generated by the physical channel signal generation unit 1031 includes Training field (TF) that each STA uses for channel estimation and data transmitted by a MAC service data unit (MSDU). Since the number of STAs is set to 8 in FIG. 1, an example of generating the baseband signals to be transmitted to the STAs 2-1 to 4 and the STAs 3-1 to 4 is illustrated, but the present embodiment is not limited to this.

The frame configuration unit 1032 multiplexes the signal generated by the physical channel signal generation unit 1031 and the signal generated by the control signal generation unit 1033, and constitutes a transmission frame of the baseband signal actually transmitted by the AP 1.

FIG. 3 is a schematic diagram illustrating an example of a transmission frame generated by the frame configuration unit 1032 according to the present embodiment. The transmission frame includes reference signals such as L-STF, L-LTF, VHT-STF, and VHT-LTF. Further, the transmission frame includes control information such as L-SIG, VHT-SIG-A, and VHT-SIG-B. Further, the transmission frame includes a Data portion. The configuration of the transmission frame generated by the frame configuration unit 1032 is not limited to that illustrated in FIG. 4, and may include other pieces of control information (for example, HT-SIG), a reference signal (for example, HT-LTF), or the like. Further, the transmission frame generated by the frame configuration unit 1032 does not need to include all signals such as L-STF and VHT-SIG-A. Since the control information included in the L-SIG or the like is information required for demodulating the Data portion, the control information included in the L-SIG or the like is also described below as the physical layer header (PHY header).

The transmission frames generated by the frame configuration unit 1032 are classified into several frame types. For example, the frame configuration unit 1032 can generate transmission frames of three frame types which are a management frame for managing a coupled state between devices, a control frame for managing a communication state between devices, and a data frame including actual transmission data. The frame configuration unit 1032 can include information indicating the frame type to which the transmission frame to be generated belongs, in the medium access control layer header (MAC header) that is transmitted in the data portion.

The wireless transmission unit 1034 converts the baseband signal generated by the frame configuration unit 1032 into a signal in a radio frequency (RF) band. The process performed by the wireless transmission unit 1034 includes digital-analog conversion, filtering, frequency conversion from a baseband to an RF band, and the like.

The antenna 105 transmits the signal generated by the transmission unit 103 to each STA.

The AP 1 also has a function of receiving a signal transmitted from each STA. The antenna 105 receives the signal transmitted from each STA and outputs it to the reception unit 104.

The reception unit 104 includes a physical channel signal demodulation unit 1041, and a wireless reception unit 1042. The wireless reception unit 1042 converts the RF band signal input from the antenna 105 into a baseband signal. The process performed by the wireless reception unit 1042 includes frequency conversion from the RF band to the baseband band, filtering, analog/digital conversion, and the like. In addition, the process performed by the reception unit 104 may include a function of measuring ambient interference in a specific frequency band and securing the frequency band (carrier sense).

The physical channel signal demodulation unit 1041 demodulates the baseband signal output from the wireless reception unit 1042. The signal demodulated by the physical channel signal demodulation unit 1041 is a signal transmitted by the STA 2 and the STA 3 on the uplink, and its frame configuration is the same as that of the data frame generated by the frame configuration unit 1032. Therefore, the physical channel signal demodulation unit 1041 can demodulate the uplink data from the data channel based on the control information transmitted on the control channel of the data frame. In addition, the physical channel signal demodulation unit 1041 may include a carrier sense function. In addition, the reception unit 104 may input the signal power in the frequency band to the higher layer unit 101 through the control unit 102, and the higher layer unit 101 may perform processing related to the carrier sense.

Since the AP 1 communicates based on the CSMA/CA described above, the transmission frame can be transmitted only for frequency bands that can be secured by the carrier sense by the reception unit 104. The AP 1 according to the present embodiment and the STA 2 which will be described later can change the CCA level, and can use, for example, a CCA level higher than the CCA level used by the STA 3 that is the legacy terminal device.

The AP 1 according to the present embodiment is capable of instructing the STA 2 to perform carrier sense at a CCA level different from that of the STA 3 that is a legacy terminal device. For example, the AP 1 can directly describe the CCA level value in the CCA field of the beacon frame. The STA 2 can recognize the CCA level usable by the STA 2 in the BSS managed by the AP 1 that transmitted the beacon frame, by receiving the beacon frame and reading the CCA level described in the CCA field. On the other hand, since the STA 3 which is the legacy terminal device cannot read the CCA field, communication is performed based on the existing CCA level. Hereinafter, the CCA level used by the STA 3 is described as the legacy CCA level. Unless otherwise specified, in the case of simply describing the CCA level or describing the variable CCA level, it refers to the CCA level that can be used by the STA 2 or the AP 1 to which the present invention is applied. The CCA level that can be used only by the STA 2 is also described as a first CCA level, and the legacy CCA level is described as a second CCA level.

The AP 1 can also describe a difference (CCA offset) between the legacy CCA level and the variable CCA level in the CCA field.

In addition, the STA 2 previously recognizes at least one CCA level different from the legacy CCA level as the variable CCA level, and the AP 1 can signal to the STA 2 that the variable CCA level different from the legacy CCA level is used, in the beacon frame. In this case, one-bit information indicating whether or not the variable CCA level is used is described in the CCA field.

The AP 1 can signal the above information in a management frame other than the beacon frame. Further, instead of signaling the information on the CCA level in the transmission frame of a specific type, the AP 1 can include the information (for example, CCA level or CCA offset), for example, in the PHY header of a transmission frame.

The AP 1 does not necessarily signal an usage instruction of a CCA level different from the legacy CCA level, to the STA 2. For example, when most of the devices coupled with the AP 1 are the STAs 2, or most of the types (kinds) of the signals transmitted by the AP 1 are signals addressed to the STA 2 to which the present invention is applied, or when most of the types of the signals received by the AP 1 are signals received from the STA 2 to which the present invention is applied, the AP 1 may signal the legacy CCA level to the STA 2, or stop the notification of the CCA level itself.

However, there is a problem that in a case where the AP 1 and the STA 2 use a higher CCA level than that of the STA 3 which is a legacy terminal device, the AP 1 and the STA 2 can acquire communication opportunities at a high frequency, while the STA 3 which cannot change the CCA level hardly acquires communication opportunities.

In order to deal with such a problem, the AP 1 according to the present embodiment temporally divides and sets a section in which the AP 1 and the STA 2 can change the CCA level and a section in which the AP 1 and the STA 2 cannot change the CCA level.

Figure 4:
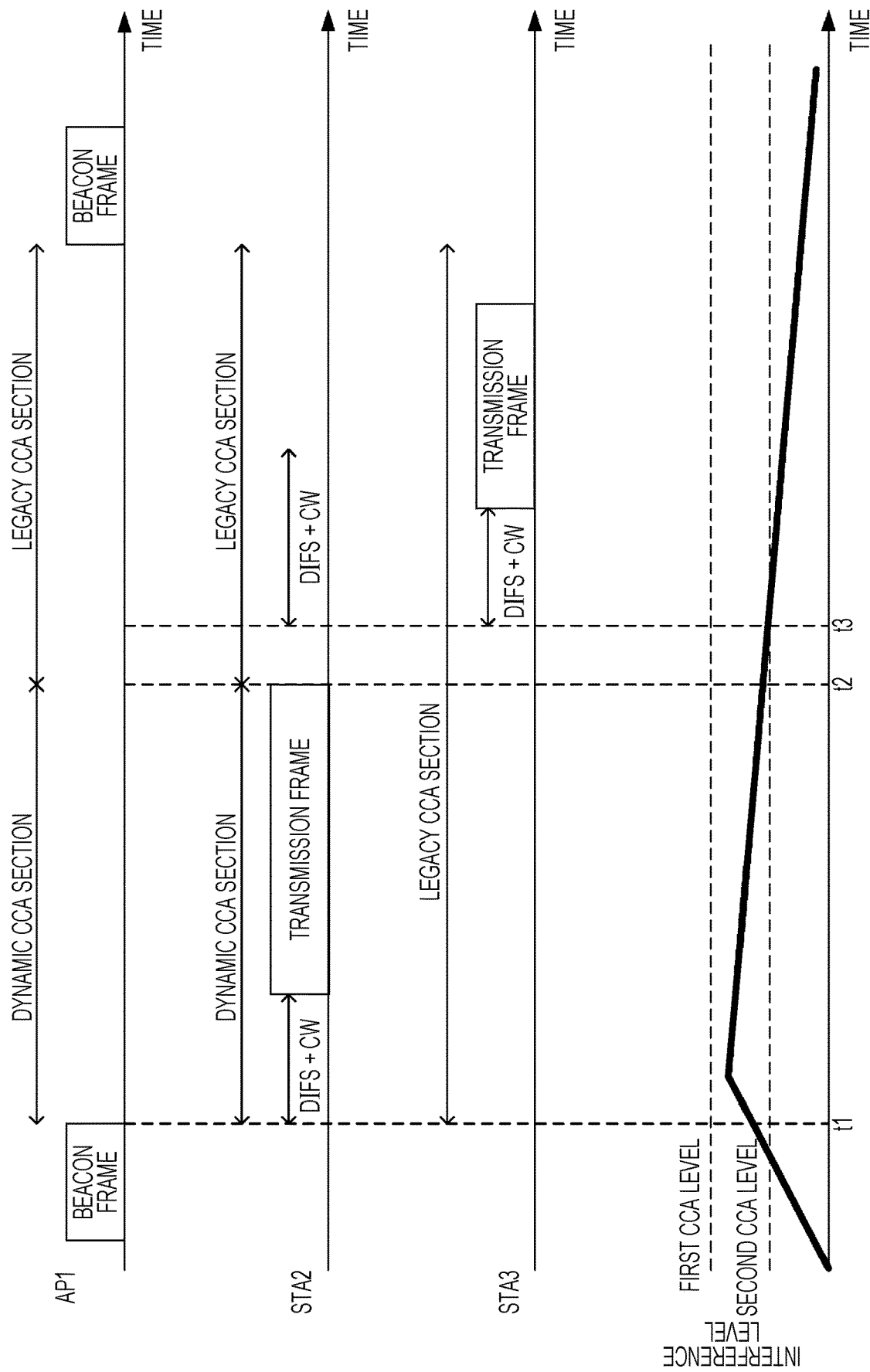
FIG. 4 is a diagram illustrating an example of communication according to the present invention.

FIG. 4 is a diagram illustrating an example of communication according to this embodiment. Here, it is assumed a case where a transmission frame addressed to the AP 1 occurs in the STA 2 and the STA 3. In addition, the interference levels around the STA 2 and the STA 3 are also shown. First, the AP 1 periodically transmits a beacon frame to the BSS. The AP 1 can add to the beacon frame information indicating the lengths and the periods of a section in which the CCA level can be changed (also referred to as a dynamic CCA section, first CCA section) and a section in which the CCA level cannot be changed (also referred to as a legacy CCA section, second CCA section).

Figure 5:
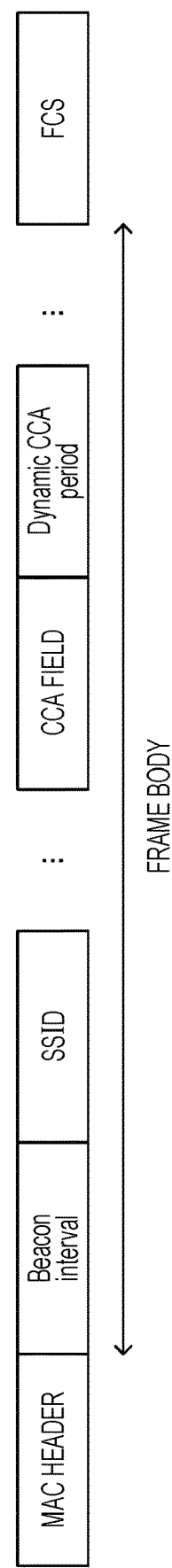
FIG. 5 is a diagram illustrating a configuration example of a signal of the present invention.

FIG. 5 is a schematic diagram illustrating an example of a beacon frame transmitted by the AP 1 according to the present embodiment. The beacon frame includes a MAC header including a frame type, a source address, and the like, a frame body including actual data, and a frame check sequence (FCS) for checking whether there is an error in the frame. The frame body of the beacon frame generated by the AP 1 according to the present embodiment includes a field (Field) describing an interval (Beacon interval) in which a beacon is transmitted and information for identifying the AP 1 (Service set identifier (SSID) or the like), the beacon also including an existing beacon frame (legacy beacon frame) that can be received also by the STA 3 which is the legacy terminal. The frame body of the beacon frame generated by the AP 1 according to the present embodiment further includes a field (CCA field) describing information on a clear channel assessment (CCA) used when the STA 2 performs carrier sense and a field (Dynamic CCA period field) describing the length of the first CCA period.

Since the values of the CCA field and the Dynamic CCA period field can be read, the STA 2 can know the length of the first CCA period and the CCA level within the first CCA period. Meanwhile, since the STA 3 cannot read the values of the CCA field and the Dynamic CCA period field, the carrier sense is always performed at the second CCA level during a period between the beacon frame and the beacon frame.

In addition, in the case where the beacon frame illustrated in FIG. 5 is transmitted, the AP 1 and the STA 2 determine that the first CCA section is started after transmission of the beacon frame, perform the carrier sense based on the first CCA level only for a period indicated by the value described in the Dynamic CCA period field, and can determine that the second CCA section is started after the end of the period. Meanwhile, the AP 1 can add a field (Legacy CCA period field) describing the length of the second CCA period to the beacon frame. In this case, the AP 1 and the STA 2 determine that the second CCA section is started after transmitting the beacon frame, perform the carrier sense based on the second CCA level only for a period indicated by the value described in the Legacy CCA period field, and can determine that the first CCA section is started after the end of the period. As described above, a method in which the AP 1 signals the lengths of the first CCA section and the second CCA section to the STA 2 is not particularly limited, and signaling from the AP 1 causing the STA 2 to recognize the length of the first CCA section and the second CCA section, and preliminary agreement between the AP 1 and the STA 2 (for example, the start of the first CCA section after the beacon frame, or the like) are performed.

Although there is one first CCA section and one second CCA section during a beacon interval in FIG. 4, the AP 1 may set a plurality of first CCA sections and second CCA sections during the beacon interval.

Further, the AP 1 may transmit a beacon frame (first beacon frame) including information on the first CCA section and the second CCA section and a beacon frame (second beacon frame) without including information on the first CCA section and the second CCA section, at different periods, respectively. In this case, the AP 1 can include information indicating whether the beacon frame is the first beacon frame or the second beacon frame, in the frame body of the beacon frame to be transmitted.

In addition, the AP 1 can transmit a signal (CCA End frame: CCA-End frame) indicating the end of the first CCA section during the first CCA section. Upon receiving the CCA-End frame, the STA 2 performs communication in the DCF mode based on the second CCA level, until receiving at least the next beacon frame.

Further, the AP 1 can notify the STA 2 of the length and period of the first CCA section described above, based on a frame (for example, a probe response frame) other than the beacon frame. Further, the AP 1 can also notify the STA 2 by including the information on the length and period of the first CCA section described above in the PHY header.

In addition, the reception unit 104 of the AP 1 can perform carrier sense based on the first CCA level during the first CCA section, but may perform carrier sense based on the second CCA level. Further, the reception unit 104 of the AP 1 may also switch the first CCA level and the second CCA level even in the first CCA section, depending on the type of the received frame. For example, the reception unit 104 of the AP 1 performs carrier sense at the first CCA level in a case where the received frame is a frame of a standard to which the invention can be applied, and on the other hand, performs carrier sense at the second CCA level in a case where the received frame is a frame of a standard to which the invention cannot be applied.

In addition, the reception unit 104 of the AP 1 performs carrier sense at the first CCA level in a case where a frame scheduled to be transmitted by the transmission unit 103 is a frame of a standard to which the invention can be applied, and on the other hand, performs carrier sense at the second CCA level in a case where a frame scheduled to be transmitted by the transmission unit 103 is a frame of a standard to which the invention cannot be applied. In addition, the AP 1 may change the priority of the frame to be transmitted, based on the CCA level used by the reception unit 104 for carrier sense. For example, in a case where the reception unit 104 determines that the radio resource can be secured at the first CCA level from a result of performing the carrier sense at the first CCA level and the second CCA level, respectively, the transmission unit 103 may perform control so as to preferentially transmit a frame of a standard to which the invention can be applied.

Returning to FIG. 4, since the interference level is lower than the first CCA level at time t1, the STA 2 can attempt to acquire a transmission opportunity. The STA 2 can transmit a transmission frame, in a case where the interference level does not exceed the first CCA level during DIFS and CW. On the other hand, since the STA 3 performs the carrier sense based on the second CCA level, the STA 3 does not attempt to acquire the transmission opportunity at the time t1.

Next, at time t2, the STA 2 also enters a legacy CCA section, and starts carrier sense at the second CCA level. At time t2, since there still exists interference that exceeds the second CCA level, the STA 2 also does not attempt to acquire a transmission opportunity.

Next, since the interference level is lower than the second CCA level at time t3, both the STA 2 and the STA 3 attempt to acquire a transmission opportunity. Then, a terminal with a small total period of DIFS and CW (STA 3 in FIG. 4) can acquire a transmission opportunity. Therefore, since the transmission opportunities of the STA 2 and the STA 3 can be equalized in the legacy CCA section, it is possible to minimize a reduction in the transmission opportunity of the STA 3 which is a legacy terminal device using the legacy CCA level, even in the communication system in which the CCA level can be changed.

Figure 6:
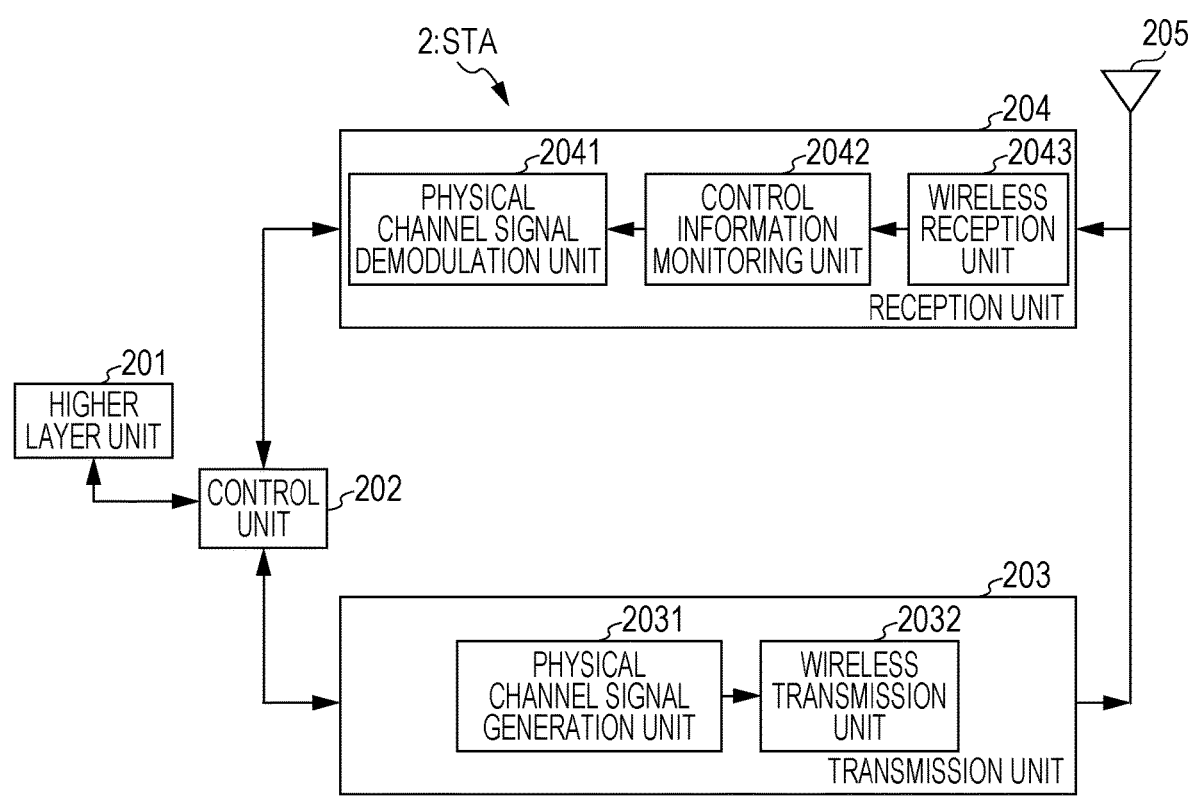
FIG. 6 is a schematic block diagram illustrating a configuration example of a radio reception device according to the present invention.

FIG. 6 is a block diagram illustrating a configuration example of the STA 2 according to the present embodiment.

As illustrated in FIG. 6, the STA 2 includes a higher layer unit 201, a control unit 202, a transmission unit 203, a reception unit 204, and an antenna 205.

The higher layer unit 201 handles the MAC layer or the like. In addition, the higher layer unit 201 generates information for controlling the transmission unit 203 and the reception unit 204, and outputs the information to the control unit 202.

The antenna 205 receives the signal transmitted by the AP 1 and outputs it to the reception unit 204.

The reception unit 204 includes a physical channel signal demodulation unit 2041, a control information monitoring unit 2042, and a wireless reception unit 2043. The wireless reception unit 2043 converts the RF band signal input from the antenna 205 into a baseband signal. The process performed by the wireless reception unit 2043 includes frequency conversion from the RF band to the baseband band, filtering, analog/digital conversion, and the like.

The control information monitoring unit 2042 reads information described in the PHY header (for example, L-SIG or VHT-SIG-A) of the transmission frame transmitted by the AP 1 from the baseband signal output by the wireless reception unit 2043, and inputs it to the physical channel signal demodulation unit 2041.

The physical channel signal demodulation unit 2041 demodulates the transmission frame transmitted by the AP 1, based on the control information acquired by the control information monitoring unit 2042 and inputs the demodulation result to the higher layer unit 201 through the control unit 202.

The higher layer unit 201 interprets the data demodulated by the physical channel signal demodulation unit 2041 in the MAC layer, the logical link control (LLC) layer, and the transport layer, respectively. As the process in the MAC layer by the higher layer unit 201, information on the CCA level can be acquired from the transmission frame transmitted by the AP 1. For example, in a case where the higher layer unit 201 recognizes that the transmission frame transmitted by the AP 1 is a beacon frame, it is possible to acquire the lengths of the CCA level and the first CCA section described in the CCA field and Dynamic CCA period field of the beacon frame, respectively. Further, the acquired lengths of the CCA level and the first CCA section may be input to the reception unit 2043 through the control unit 202.

In addition, the process performed by the reception unit 204 may include a function of measuring (carrier sense) ambient interference in a specific frequency band and securing the frequency band.

The STA 2 also has a function of transmitting a signal. The antenna 205 transmits the signal of the RF band generated by the transmission unit 203 to the AP 1.

The transmission unit 203 includes a physical channel signal generation unit 2031 and a wireless transmission unit 2032. The physical channel signal generation unit 2031 generates a baseband signal that the STA 2 transmits to the AP 1. The signal generated by the physical channel signal generation unit 2031 has the same configuration as the transmission frame generated by the frame configuration unit 1032 of the AP 1.

The wireless transmission unit 2032 converts the baseband band signal generated by the physical channel signal generation unit 2031 into a signal in the RF band. The process performed by the wireless transmission unit 2032 includes digital-analog conversion, filtering, frequency conversion from a baseband to an RF band, and the like.

Here, since the STA 2 is coupled with the AP 1 based on the CSMA/CA, the reception unit 204 performs the carrier sense prior to the transmission process of the transmission unit 203. In a case of receiving a signal having a power of the designated CCA level or more in a certain frequency band, the reception unit 204 can start at least the operation of signal demodulation of the PHY layer. Therefore, in a case where the reception unit 204 does not start the operation of signal demodulation of the PHY layer in the frequency band, it is determined that the frequency band can be secured, such that the transmission unit 203 can start the transmission processing.

In addition, depending on the carrier sense, the reception unit 204 may determine whether or not to start the reception operation, and whether or not the transmission processing can be started. Meanwhile, the reception unit 204 only notifies the higher layer unit 201 of the power of the signal measured in the frequency band through the control unit 202, and the higher layer unit 201 may determine whether or not the reception unit 204 starts the receiving operation in the frequency band, and whether or not the transmission unit 203 can start the transmission process (whether or not the frequency band can be secured). The following description will be made assuming that the reception unit 204 performs the determination related to carrier sense, for the sake of simplicity.

The reception unit 204 can recognize the section in which the CCA level is changed and the section using the legacy CCA level, based on the length of the first CCA section notified from the higher layer unit 201. The reception unit 204 can perform carrier sense based on the CCA level notified from the higher layer unit 201, in the section in which the CCA level is changed. For example, in a case where the power of the signal received by the wireless reception unit 2043 of the reception unit 204 is larger than the CCA level, the reception unit 204 determines that the frequency band cannot be ensured. In contrast, in a case where the power of the signal received by the wireless reception unit 2043 of the reception unit 204 is smaller than the CCA level, the reception unit 204 can determine that the frequency band can be ensured. Therefore, the higher the CCA level used by the reception unit 204, the greater the communication opportunity of the STA 2.

On the other hand, when the number of STAs 2 provided in the communication system is large and the CCA level used by each STA 2 is high, a lot of interference is included in the signals received by each STA 2, such that the reception quality of the transmission frame transmitted by the STA 2 deteriorates. Therefore, the physical channel signal generation units 1031 and 2031 of the AP 1 and the STA 2 can use a data modulation scheme with a low modulation level or an error correction code with a low coding rate in anticipation of loss of reception quality in advance.

Further, the reception unit 204 may change the CCA level depending on the type (kind) of the received signal, even in the first CCA section. For example, carrier sense can be performed at the CCA level notified from the AP 1, only when it is determined that the signal received by the reception unit 204 is a transmission frame transmitted from another STA 2 to which the present invention is applied. On the other hand, when the received signal is determined to be a transmission frame transmitted from another STA 3 that is a legacy terminal device, the reception unit 204 can perform carrier sense at the legacy CCA level. Further, the reception unit 204 may change the CCA level, depending on whether or not the received signal is a signal based on the IEEE 802.11 system, even in the first CCA section. For example, in a case where the reception unit 204 fails to read the PHY header from the received signal, it is determined that it is not a signal of the IEEE 802.11 system, and carrier sense may be performed at a CCA level higher than the first CCA level. It is the same in the case of determining whether or not the higher layer unit 201 can secure the frequency band.

Further, the reception unit 204 may change the CCA level depending on the frequency (histogram) of the received signal, even in the first CCA section. For example, when most of the signals received by the reception unit 204 during a certain period is a transmission frame transmitted from a different STA 2 to which the present invention is applied, the reception unit 204 can perform carrier sense at a CCA level notified from the AP 1. On the other hand, when most of the signals received by the reception unit 204 during a certain period is a transmission frame transmitted from the STA 3 to which the present invention is not applied, the reception unit 204 can perform carrier sense at the legacy CCA level. In addition, information on the histogram described above can be signaled from the AP1 to the STA 2. It is the same in the case of determining whether or not the higher layer unit 201 can secure the frequency band.

While the reception unit 104 of the AP 1 can perform carrier sense based on the first CCA level during the first CCA section, carrier sense may be performed based on the second CCA level. Further, the reception unit 104 of the AP 1 may also switch the first CCA level and the second CCA level even in the first CCA section, depending on the type of the received frame. For example, the reception unit 104 of the AP 1 performs carrier sense at the first CCA level in a case where the received frame is a frame of a standard to which the invention can be applied, and on the other hand, performs carrier sense at the second CCA level in a case where the received frame is a frame of a standard to which the invention cannot be applied.

In addition, the reception unit 204 of the STA 2 performs carrier sense at the first CCA level in a case where a frame scheduled to be transmitted by the transmission unit 203 is a frame of a standard to which the invention can be applied, and on the other hand, the reception unit 204 may perform carrier sense at the second CCA level in a case where a frame scheduled to be transmitted by the transmission unit 203 is a frame of a standard to which the invention cannot be applied. In addition, the STA 2 may change the priority of the frame to be transmitted, based on the CCA level used by the reception unit 204 for carrier sense. For example, in a case where the reception unit 204 determines that the radio resource can be secured at the first CCA level from a result of performing the carrier sense at the first CCA level and the second CCA level, respectively, the transmission unit 203 may perform control so as to preferentially transmit a frame of a standard to which the invention can be applied.

In addition, in the first CCA section, the reception unit 204 may shift to the second CCA section while performing carrier sense based on the first CCA level. In this case, the reception unit 204 can end the carrier sense based on the first CCA level (reset the CW) and perform carrier sense again based on the second CCA level. Further, even in a case of shifting to the second CCA section while performing carrier sense based on the first CCA level, the reception unit 204 may perform the carrier sense based on the first CCA level, and after a predetermined time has elapsed from the time of switching to the second CCA section, the reception unit 204 may set the CCA level to the second CCA level and continue the carrier sense.

In the communication system to which the embodiment is directed, the STA 2 is also possible to perform carrier sense at the CCA level (third CCA level) lower than the legacy CCA level in the second CCA section. In this case, the AP 1 can notify the STA 2 of the third CCA level by using a beacon frame or the like.

In the method explained above, basically, the AP 1 and the STA 2 distinguish the first CCA section from the second CCA section, based on the information described in the beacon frame transmitted by the AP 1, but the AP 1 may temporally separate the first CCA section and the second CCA section based on a transmission frame other than the beacon frame. For example, the AP 1 may separate the first CCA section and the second CCA section by sending a frame (CCA start frame: CCA-Start frame) indicating the start of the first CCA section and a CCA-End frame to the STA 2. Further, the AP 1 may broadcast the CCA-Start frame and the CCA-End frame to all the STAs 2, may transmit them to a specific STA 2, or may transmit them to a group of a specific STA 2. In this case, upon receiving the CCA-Start frame, the STA 2 can perform communication in the DCF mode, based on the first CCA level, until receiving the next CCA-End frame.

According to the AP 1 and the STA 2 described above, a communication system is possible which is capable of securing communication opportunities of the existing STA 3 while the AP 1 and the STA 2 perform communication based on the CCA level higher than the existing STA 3, thereby greatly improving a system throughput of the communication system.

2. Second Embodiment

In the communication system to which the embodiment is directed, the first CCA section and the second CCA section are switched by virtual carrier sense.

Since the outline of the communication system to which the embodiment is directed and the configurations of the AP 1 and the STA 2 are the same as those in Embodiment 1, the description thereof will be omitted. Similarly to the first embodiment, it is assumed that the AP 1 notifies the STA 2 of the first CCA level by a beacon frame or the like.

In the communication system according to the present embodiment, the AP 1 transmits a CTS-to-self frame (hereinafter referred to as a Legacy CTS-to-self frame or a second resource reservation frame) that can also be recognized by the STA 3, before the first CCA section. Since the CTS-to-self frame is a CTS frame in which the address of the transmission station is described in the destination address, the reception station that has received the CTS-to-self frame sets NAV according to the duration described in the CTS-to-self frame, and does not attempt to acquire communication opportunities. Therefore, since the AP 1 transmits the CTS-to-self frame describing the length of the first CCA section as the duration, the STA 3 which is a legacy terminal device does not attempt to acquire a communication opportunity during the first CCA section. On the other hand, the STA 2 according to the present embodiment does not set the NAV, even when receiving the Legacy CTS-to-self frame, and performs communication in the DCF mode, based on the first CCA level. By controlling in this way, the STA 3, which is a legacy terminal device, does not attempt to acquire transmission opportunities in the first CCA section, in which it is relatively difficult to acquire transmission opportunities, such that the burden on carrier sense can be reduced. On the other hand, in the first CCA section, only the STA 2 capable of performing carrier sense at the first CCA level attempts to acquire the transmission opportunity, such that the spectral efficiency of the communication system can be improved.

In addition, before the second CCA section, the AP 1 transmits a CTS-to-self frame (hereinafter referred to as a CCA CTS-to-self frame or a first resource reservation frame) that cannot be recognized by the STA 3 but can be recognize by the STA 2, by describing the length of the second CCA section as a duration therein. Although the frame configuration of the CCA CTS-to-self frame is not particularly limited, it may be configured to have a PHY header that the STA 3 cannot recognize, for example. Since the STA 3 cannot recognize the CCA CTS-to-self frame as a CTS-to-self frame, after receiving the CCA CTS-to-self frame, the STA 3 can perform communication in the DCF mode based on the second CCA level. On the other hand, in a case of receiving the CCA CTS-to-self frame, the STA 2 sets the NAV based on the duration described in the CCA CTS-to-self frame, and thus the STA 2 does not attempt to acquire the communication opportunity during the second CCA section. Therefore, since only the STA 3 attempts to acquire a transmission opportunity in the second CCA section, it is possible to secure the transmission opportunity of the STA 3 even in a communication system in which the STA 2 and the STA 3 coexist.

FIG. 7 is a diagram illustrating an example of communication according to this embodiment. The AP 1 first transmits a Legacy CTS-to-self frame describing the length of the first CCA section (the length of t1 to t2 in FIG. 7) as a duration, before the first CCA section (dynamic CCA section). The STA 3 sets NAV only to the duration described in the Legacy CTS-to-self frame. On the other hand, the STA 2 performs communication in the DCF mode, based on the first CCA level, without setting the NAV even when receiving the Legacy CTS-to-self frame.

On the other hand, the AP 1 transmits a CCA CTS-to-self frame describing the length of the second CCA section (the length of t3 to t4 in FIG. 7) as a duration, before the second CCA section. The STA 2 sets NAV only to the duration described in the CCA CTS-to-self signal. On the other hand, since the STA 3 cannot recognize the CCA CTS-to-self frame as a CTS-to-self frame, after receiving the CCA CTS-to-self frame, the STA 3 can perform communication in the DCF mode based on the second CCA level.

Note that the way of operation of the STA 2 in a section other than the duration described in the Legacy CTS-to-self and the CCA CTS-to-self is not particularly limited. For example, in the period between t2 and t3 in FIG. 7, the STA 2 can perform communication in the DCF mode based on the first CCA level.

In a case of receiving the CCA CTS-to-self signal, the STA 2 may perform communication in the DCF mode based on the second CCA level during the duration period described in the CCA CTS-to-self signal.

Further, when transmitting the Legacy CTS-to-self frame, the AP 1 may describe the first address which is previously agreed with the STA 2, rather than the address (second address) of the AP 1 as the destination address of the frame. For example, the AP 1 can describe the broadcast address as the first address, in the destination address of the frame. In a case of receiving the Legacy CTS-to-self frame in which the first address is described, the STA 2 performs communication in the DCF mode based on the first CCA level. In a case of receiving the Legacy CTS-to-self frame in which the second address is described, the STA 2 can stop communication. By controlling in this way, it is possible to avoid the problem that the STA 2 stars communication in the DCF mode based on the first CCA level, in a case of receiving the Legacy CTS-to-self frame describing the address of the STA 2 (second address) transmitted by a legacy AP to which the present invention cannot be applied.

Note that the resource reservation frame transmitted by the AP 1 is not limited to the CTS to-self frame described above. For example, the AP 1 and the STA 2 according to the present embodiment can temporally divide the first CCA section and the second CCA section by exchanging the RTS frame and the CTS frame.

In this case, before the first CCA section, the AP 1 transmits to a specific STA 2 in the BSS, an RTS frame (also referred to as the Legacy RTS frame) that can also be recognized by the STA 3, by describing the length of the first CCA section as a duration therein. Upon receiving the Legacy RTS frame, the STA 2 transmits to the AP 1, a CTS frame (also referred to as a Legacy CTS frame) that can also be recognized by the STA 3, by describing a period obtained by subtracting a period requiring for transmitting and receiving the Legacy CTS frame from a duration indicating the first CCA section described in the Legacy RTS frame as the duration. Upon receiving the Legacy RTS frame or the Legacy CTS frame, the STA 3 sets the NAV only to the duration described in the respective frames, and thus the STA 3 does not attempt to acquire a communication opportunity during the first CCA section. Meanwhile, upon receiving (or transmitting) the Legacy RTS frame or the Legacy CTS frame, the AP 1 and the STA 2 performs communication in the DCF mode based on the first CCA level, during the duration described in the respective frames.

On the other hand, before the second CCA section, the AP 1 transmits to a specific STA 2 in the BSS, an RTS frame (also referred to as the CCA RTS frame) that cannot be recognized by the STA 3, by describing the length of the second CCA section as a duration therein. Upon receiving the CCA RTS frame, the STA 2 transmits to the AP 1, a CTS frame (also referred to as a CCA CTS frame) that cannot be recognized by the STA 3, by describing a period obtained by subtracting a period requiring for transmitting and receiving the CCA CTS frame from a duration indicating the second CCA section described in the CCA RTS frame as the duration. Upon receiving (or transmitting) the CCA RTS frame or the CCA CTS frame, the STA 2 sets the NAV only to the duration described in the respective frames, and thus the STA 2 does not attempt to acquire the communication opportunity during the second CCA section. On the other hand, since the STA 3 cannot recognize the CCA RTS and the CCA CTS, the STA 3 performs communication in the DCF mode based on the second CCA level, during the second CCA section. By controlling in this way, the AP 1 can temporally divide the first CCA section and the second CCA section. Note that when receiving the CCA RTS or the CCA CTS, the STA 2 may perform communication in the DCF mode based on the second CCA level during the duration period described in each frame, instead of setting the NAV.

According to the AP 1 and the STA 2 described above, a communication system can be obtained in which the AP 1 and the STA 2 perform communication based on the CCA level higher than that of the existing STA 3 and communication opportunities of the existing STA 3 can be secured, such that it is possible to greatly improve the system throughput of the communication system.

[3. Things Common to all Embodiments]

Programs operating on the AP 1, the STA 2 and the STA 3 according to the present invention are programs for controlling the CPU and the like so as to realize the functions of the above embodiments according to the present invention (programs for causing a computer to function). Information handled by these devices is temporarily stored in the RAM at the time of processing, and thereafter is stored in various ROMs and HDDs, and is read, modified and written by the CPU as needed. Examples of the recording medium for storing the program include a semiconductor medium (for example, a ROM, a non-volatile memory card, or the like), an optical recording medium (for example, a DVD, an MO, an MD, a CD, a BD, or the like), and a magnetic recording medium (for example, a flexible disk, or the like). Further, the functions of the above-described embodiments are realized by executing the loaded program, and the functions of the invention may be realized by processing in cooperation with the operating system or another application program or the like based on the instruction of the program, in some cases.

In the case of being distributed in the market, the program can be distributed by being stored in a portable recording medium, or be transferred to a server computer coupled through a network such as the Internet. In this case, the storage device of the server computer is also included in the present invention. In addition, some or all of the AP 1, the STA 2 and the STA 3 according to the above-described embodiments may be realized as an LSI which is a typical integrated circuit. The functional blocks of the AP 1, the STA 2 and the STA 3 may be individually formed into chips, or some or all of them may be integrated into chips. When respective functional block are integrated, an integrated circuit control unit for controlling them is added.

In addition, a method of forming an integrated circuit is not limited to LSI, and it may be realized by a dedicated circuit or a general-purpose processor. In addition, when advances in semiconductor technology have led to the development of integrated circuit technology to replace LSI, it is also possible to use an integrated circuit according to the technology.

The present invention is not limited to the above-described embodiment. The AP 1, the STA 2, and the STA 3 of the present invention are not limited to application to a mobile station apparatus but can be applied to stationary or non-movable type electronic equipment installed indoors or outdoors, and it goes without saying that it can be applied to, for example, AV equipment, kitchen equipment, cleaning and laundry equipment, air conditioner, office equipment, vending machine, other living equipment, and the like.

Although the embodiment of the present invention has been described above in detail with reference to the drawings, the specific configuration is not limited to this embodiment, and designs and the like within the scope without departing from the gist of the present invention are included in the scope of the claims.

INDUSTRIAL APPLICABILITY

It is preferable that the present invention is applied to a radio transmission device, a radio reception device, a communication system, and a communication method.

Note that this international application claims priority based on Japanese Patent Application No. 2014-222235 filed on Oct. 31, 2014, and all the contents of Japanese Patent Application No. 2014-222235 are incorporated into this international application.

REFERENCE SIGNS LIST

1 AP
2, 2-1, 2-2, 2-3, 2-4, 3, 3-1, 3-2, 3-3, 3-4 STA
101, 201 HIGHER LAYER UNIT
102, 202 CONTROL UNIT
103, 203 TRANSMISSION UNIT
104, 204 RECEPTION UNIT
105, 205 ANTENNA
1031, 2031 PHYSICAL CHANNEL SIGNAL GENERATION UNIT
1032 FRAME CONFIGURATION UNIT
1033 CONTROL SIGNAL GENERATION UNIT
1034, 2032 WIRELESS TRANSMISSION UNIT
1041, 2041 PHYSICAL CHANNEL SIGNAL DEMODULATION UNIT
1042, 2043 WIRELESS RECEPTION UNIT
2042 CONTROL INFORMATION MONITORING UNIT

The invention claimed is:

1. A radio transmission device which performs communication with a radio reception device, the radio transmission device comprising:
a reception unit that performs carrier sense; and
a transmission unit that transmits a frame including information indicating whether or not to start a reception operation based on a first CCA level,
wherein the transmission unit transmits at least one of a frame including information indicating a first CCA period in which the reception operation based on the first CCA level is possible, and a frame including information indicating a second CCA period in which a reception operation based on a second CCA level is possible.

2. The radio transmission device according to claim 1, wherein the reception unit performs the reception operation based on the first CCA level in a case where the frame received in the first CCA period is a predetermined type of frame.

3. The radio transmission device according to claim 2, wherein the reception unit is capable of changing the first CCA level.

4. The radio transmission device according to claim 2, wherein the first CCA level is higher than the second CCA level.

5. A radio reception device which performs communication with a radio transmission device, the radio reception device comprising:
a transmission unit that transmits a frame; and
a reception unit that receives a frame including information indicating whether or not to start a reception operation based on a first CCA level, and determines whether or not to perform the reception operation based on the first CCA level in a case where the information indicating whether or not to start the reception operation based on the first CCA level indicates that the reception operation is enabled,
wherein the reception unit receives at least one of a frame including information indicating a first CCA period in which whether or not to perform the reception operation based on the first CCA level is determined, and a frame including information indicating a second CCA period in which whether or not to perform the reception operation based on a second CCA level is determined.

6. The radio reception device according to claim 5, wherein the reception unit performs the reception operation based on the first CCA level in a case where a frame received in the first CCA period is a predetermined type of frame.

7. The radio reception device according to claim 6, wherein the reception unit is capable of changing the first CCA level.

8. The radio reception device according to claim 6, wherein the first CCA level is higher than the second CCA level.

9. A communication method of a radio transmission device which performs communication with a radio reception device, the method comprising:
- a step of performing carrier sense;
- a step of transmitting a frame including information indicating whether or not to start a reception operation based on a first CCA level; and
- a step of transmitting at least one of a frame including information indicating a first CCA period in which the reception operation based on the first CCA level is possible, and a frame including information indicating a second CCA period in which a reception operation based on a second CCA level is possible.

* * * * *